(12) United States Patent
Turner et al.

(10) Patent No.: US 8,239,801 B2
(45) Date of Patent: Aug. 7, 2012

(54) ARCHITECTURALLY INDEPENDENT NOISE SENSITIVITY ANALYSIS OF INTEGRATED CIRCUITS HAVING A MEMORY STORAGE DEVICE AND A NOISE SENSITIVITY ANALYZER

(75) Inventors: Mark F. Turner, Longmont, CO (US);
Jeff S. Brown, Fort Collins, CO (US);
Joseph Simko, Whitehall, PA (US);
Miguel A. Vilchis, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 608 days.

(21) Appl. No.: 12/347,916

(22) Filed: Dec. 31, 2008

(65) Prior Publication Data

US 2010/0169850 A1    Jul. 1, 2010

(51) Int. Cl.
*G06F 17/50* (2006.01)
*G06F 9/455* (2006.01)
*G01R 27/28* (2006.01)

(52) U.S. Cl. ............ 716/115; 716/111; 703/14; 703/15; 702/117

(58) Field of Classification Search .................. None
See application file for complete search history.

(56) References Cited

U.S. PATENT DOCUMENTS

| | | | | |
|---|---|---|---|---|
| 4,439,858 A * | 3/1984 | Petersen | .................. | 714/734 |
| 5,410,551 A * | 4/1995 | Edwards et al. | .............. | 714/736 |
| 6,449,753 B1 * | 9/2002 | Aingaran et al. | ............. | 716/115 |
| 6,493,853 B1 * | 12/2002 | Savithri et al. | ................ | 716/115 |
| 6,567,773 B1 * | 5/2003 | Rahmat et al. | .................. | 703/14 |
| 6,675,118 B2 * | 1/2004 | Wanek et al. | ................ | 702/117 |
| 6,941,258 B2 * | 9/2005 | Van Heijningen et al. | ..... | 703/16 |
| 7,170,298 B2 * | 1/2007 | Parker et al. | .................. | 324/538 |
| 7,236,919 B2 * | 6/2007 | Fulkerson | ...................... | 703/16 |
| 7,877,713 B2 * | 1/2011 | Kariat et al. | .................. | 716/115 |
| 2002/0112212 A1 * | 8/2002 | Cohn et al. | ........................ | 716/1 |
| 2002/0193959 A1 * | 12/2002 | Wanek et al. | ................ | 702/117 |
| 2003/0079191 A1 * | 4/2003 | Savithri et al. | .................... | 716/4 |
| 2008/0281572 A1 * | 11/2008 | Puri et al. | ........................ | 703/16 |
| 2009/0007032 A1 * | 1/2009 | Kariat et al. | ...................... | 716/4 |
| 2009/0192777 A1 * | 7/2009 | Clement et al. | ................. | 703/16 |
| 2011/0071812 A1 * | 3/2011 | Fang | .............................. | 703/14 |
| 2011/0270598 A1 * | 11/2011 | Zou et al. | ........................ | 703/14 |

* cited by examiner

*Primary Examiner* — Leigh Garbowski
*Assistant Examiner* — Annette M. Thompson

(57) ABSTRACT

Method of analyzing noise sensitivity of integrated circuits having at least one memory storage device and a noise sensitivity analyzer. In one embodiment, the noise sensitivity analyzer includes a circuit reservoir, a circuit parser and a circuit evaluator. The circuit reservoir is configured to receive and store a model of a circuit having at least one memory storage device to be analyzed. The circuit parser is configured to identify nodes of the model. The circuit evaluator is configured to apply a large test current to each of the nodes for multiple circuit states of the at least one memory storage device and determine which of the nodes are sensitive nodes.

18 Claims, 3 Drawing Sheets

ARCHITECTURALLY INDEPENDENT NOISE SENSITIVITY ANALYSIS OF INTEGRATED CIRCUITS HAVING A MEMORY STORAGE DEVICE AND A NOISE SENSITIVITY ANALYZER

TECHNICAL FIELD

This application is directed, in general, to memory storage devices and, more specifically, to determining the noise sensitivity of memory storage devices.

BACKGROUND

Storage elements are used in integrated circuits (IC) to store data as a logic state (either a "zero" or a "one"). The most basic standard cells used for storage elements are transparent latches and D-flip-flops (DFFs). Both of these storage elements use simple regenerative feedback with passgates or tristate buffers to control writing data into the element (the transparent state for a latch) versus retaining the data in the element (the latched state for a latch).

Storage elements are expected to reliably store the written data so that the correct data can be later retrieved for use. However, there are several noise sources or noise injection mechanisms that can disturb the stored data which will later give errors when reading the data. Background radiation (e.g., cosmic radiation), power supply noise and crosstalk noise from adjacent switching signals are examples of noise injection mechanisms that can disturb the stored data. Cosmic radiation, in the form of alpha particles or neutrons can inject noise into the storage elements that may upset the data stored therein. When the data is upset (i.e., changed from one logical state to another logical state), it is referred to as a Single Event Upset (SEU). Errors caused by SEUs are also referred to as soft errors since the errors are generally unrepeatable and occur randomly throughout a device. The rate at which a design is expected to have soft errors is referred to as the Soft Error Rate (SER).

Reducing power consumption by the ICs can increase the sensitivity of stored data to the various noise injection mechanisms. With reductions in IC supply voltage to reduce overall chip power, many storage elements can become exponentially more sensitive to the noise sources. This can be particularly true at voltage levels proposed for low voltage state retention intended to reduce leakage in the state retaining storage elements.

To combat the sensitivity to the noise sources, new storage architectures are being developed to reduce the likelihood of an error. Each of the new architectures need to be analyzed for noise sensitivity to demonstrate their noise immunity. The transistor architectures used in the conventional storage elements have remained relatively unchanged for 20 years. The noise sensitive nodes in these storage elements are well understood. Latches and traditional DFFs have had their noise sensitivity (calculated in terms of SER) performed by hand analysis which is time consuming and error prone.

Additionally Static Random Memories, or SRAMs, have been analyzed for Static Noise Margin (SNM) to evaluate their robustness to disturbances during their normal operation. This analysis is also performed manually and assumes a traditional SRAM bit cell architecture for the analysis. Other architectures will require independent analysis to determine which nodes to test for noise sensitivity. With the development of new architectures to improve SER and overall noise immunity (mostly due to low Vdd levels), analysis will be needed to determine noise sensitivity. Therefore, an architecture independent methodology for analyzing noise sensitivity is needed in the art.

SUMMARY

One aspect provides a noise sensitivity analyzer. In one embodiment, the noise sensitivity analyzer includes: (1) a circuit reservoir configured to receive and store a model of a circuit having at least one memory storage device to be analyzed, (2) a circuit parser configured to identify nodes of the model and (3) a circuit evaluator configured to apply a large test current to each of the nodes for multiple circuit states of the at least one memory storage device and determine which of the nodes are sensitive nodes.

In another aspect, a method of analyzing a circuit for noise sensitivity is provided. In one embodiment, the method includes: (1) receiving a model of a circuit having at least one memory storage device to be analyzed, (2) identifying nodes of the model, (3) applying a large test current to each of the nodes for multiple circuit states of the at least one memory storage device and (4) determining which of the nodes are sensitive nodes.

In yet another aspect, a method of determining a critical charge of a node of a memory storage device is provided. In one embodiment, this method includes: (1) receiving a model of a circuit having at least one memory storage device to be analyzed, (2) identifying nodes of the model, (3) applying a large test current to one of the nodes for multiple circuit states of the at least one memory storage device, (4) determining if the one node is a sensitive node for each of the multiple circuit states and (e) applying additional test currents to the one node if the one node is a sensitive node until a critical charge of the one node is determined.

BRIEF DESCRIPTION

Reference is now made to the following descriptions taken in conjunction with the accompanying drawings, in which.

DETAILED DESCRIPTION

Disclosed herein is an analyzer and methods for analyzing noise sensitivity in memory storage devices. The analyzer searches for all nodes in storage element designs, injects a large charge of current (representing noise) on each of the identified nodes and determines if each of the nodes is sensitive to the injected charge (i.e. if it disturbs a value stored therein). The value of the large test current needs to be more than sufficient to reasonably disturb the logic state of the storage element (i.e., change the logic state) if the node has noise sensitivity. Initially, the value of the large current may be defined as several orders of magnitude beyond the critical charges of the nodes.

A "critical charge" is a charge resulting from a strike (i.e., noise) that is barely sufficient to cause a memory storage device to have an SBU. When a charged particle strikes the drain of an undriven transistor, the charge that results from the strike is transferred onto the node in the circuit and can cause the voltage to droop from a nominal positive supply voltage (or rise from a nominal negative supply voltage). The amount of voltage change is dependant on the stored charge already on the node, as well as the capacitance of the node and the resistance of the driver actively driving the node. If the voltage change is enough to propagate through the memory storage device and change the circuit logic state thereof, an SBU is created.

Applying a large test current to each of the nodes can eliminate the analysis errors involved with manual analysis of new architectures for memory storage devices. To provide a complete search for sensitive nodes, the search is performed on all possible circuit states of memory storage devices including cell storage elements and memory elements. For cell storage elements, the possible circuit states include both clock states and both logic states. For memory elements, the possible circuit states include the status of the write and read word lines along with the logic states.

Figure 1:
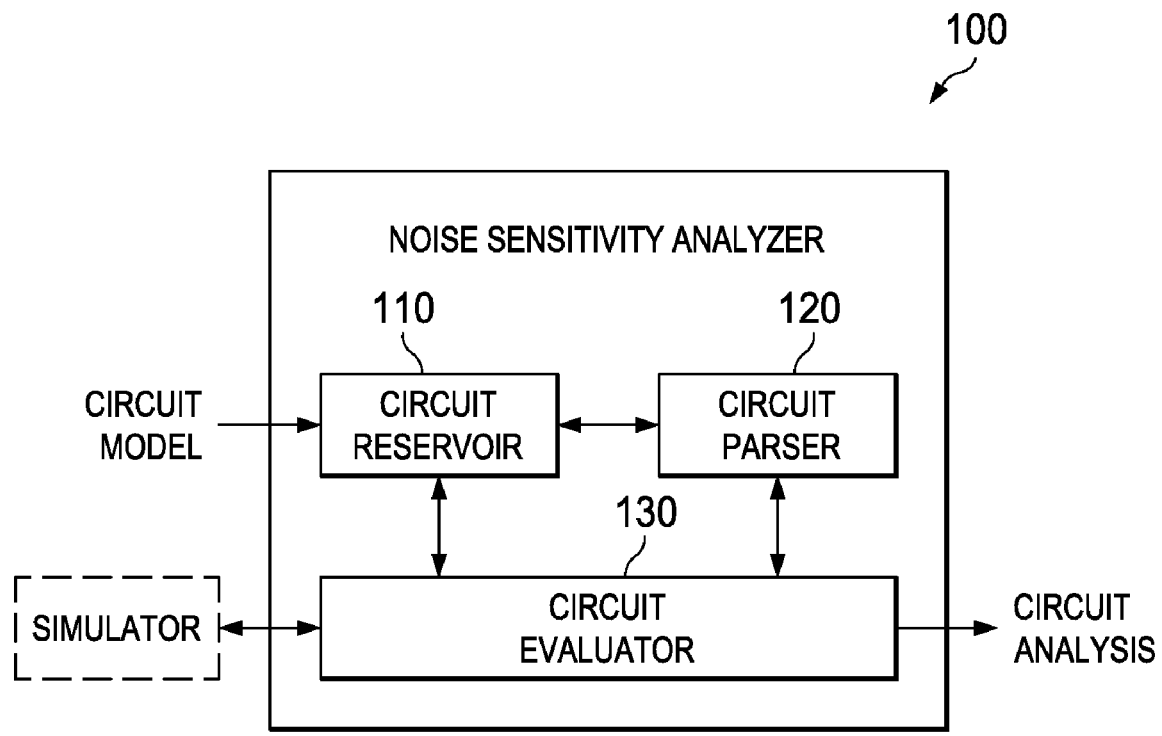
FIG. 1 is a block diagram of an embodiment of a noise sensitivity analyzer constructed according to the principles of the present invention.

FIG. 1 illustrates a block diagram of an embodiment of a noise sensitivity analyzer 100 constructed according to the principles of the present invention. The noise sensitivity analyzer 100 may be a dedicated apparatus constructed of special-purpose hardware employing a series of operating instructions which direct its operation. In alternative embodiments, the noise sensitivity analyzer 100 may be implemented on a general purpose computing device directed by a sequence of operating instructions to evaluate a circuit for noise sensitivity. The noise sensitivity analyzer 100 includes a circuit reservoir 110, a circuit parser 120 and a circuit evaluator 130.

The circuit reservoir 110 is configured to receive and store a model of an IC (i.e., a circuit model) having at least one memory storage device to be analyzed. A memory storage device may only include a standard cell storage element, such as, a latch or D flip-flop. Additionally, a memory storage device may be a memory element having associated write and read lines, such as a SRAM.

The circuit reservoir 110 may receive a circuit model via the direction of a user employing a user interface including a keyboard, a pointing device, a monitor, etc. Additionally, the circuit reservoir 110 may be coupled to a library of logic elements that can be provided to the circuit reservoir 110 to be used as the circuit models. In some embodiments, the circuit reservoir 110 may include a library of logic elements to be used as circuit models.

The circuit parser 120 is configured to identify nodes of the circuit model. The circuit parser 120 may employ a netlist file to search for and identify the nodes of the circuit model. One skilled in the art will understand how to search and locate the nodes of a circuit model.

The circuit evaluator 130 is configured to apply a large test current to each of the identified nodes for each of the multiple circuit states of the memory storage device and determine which of nodes of the memory storage device are sensitive nodes. A sensitive node is a node that is sensitive to noise such that a change in the logic state (i.e., the stored value changes from a one to zero or a zero to one) occurs in response to received noise (i.e., when the large test current is applied to the node). The large test current is sufficiently large to provide a broad indication of nodes that are sensitive to noise. Further detailed analysis, even manual analysis, may later be performed on nodes determined to be sensitive nodes to provide a more "fined tuned" understanding of noise sensitivity of the circuit model.

In one embodiment, the large test current is at least three orders of magnitude greater than an expected critical charge of a node. The expected critical charge can be based on historical testing results from similar memory storage devices. For example, if similar architectures had exhibited a critical charge on the order of 2 fC, then a test current representative of a 2000 fC charge could be used for a test.

The circuit evaluator 130 is configured to generically applying the large test current. In other words, the circuit evaluator 130 does not presume any knowledge of the physical or logical implementation of the memory storage device. Additionally, generically applying the large test current indicates that the circuit evaluator 130 does not presume any knowledge of what physical events can disturb the design. Instead, the circuit evaluator 130 can blindly test each node of a memory storage device design for sensitivity. This reduces the possibility of a designer missing sensitive nodes.

The circuit evaluator 130 may employ a common software simulator, such as Hspice, to apply the test currents to the circuit model. In some embodiments, the noise sensitivity analyzer 100 may include an electrical current simulator that is used by the circuit evaluator 130. Thus, the circuit evaluator 130 may direct the operation of a simulator external to the noise sensitivity analyzer 100, a simulator included in the noise sensitivity analyzer 100 or even an electric current simulator included in the circuit evaluator 130 itself. An external simulator is represented in FIG. 1 as an example.

The memory storage device will have multiple circuit states. The multiple circuit states include the logic state of the stored value, which is either a high or low logic state ("one" or "zero"), and each clock state of the clock which can also be high ("one") or low ("zero"). When the memory storage device is a memory element, the condition of the write and read lines is also included when determining the possible circuit states along with the clock state and the logic state of the stored value. The circuit evaluator 130 is configured to apply the large test current for each of the possible states of the memory storage device.

During part of the analysis, the circuit evaluator 130 may be configured to apply the large test current to only one of the nodes at a time. Additionally, the circuit evaluator 130 may be configured to apply the large test current to multiple of the nodes simultaneously or sequentially at different time steps. Injecting the large test current, or even other test currents representing noise, on multiple nodes at the same time can improve the analysis of the circuit model since some of data storage architectures may be relatively immune to SEUs but can be disturbed by Multiple Event Upsets (MEUs). Manual evaluation of the interaction of multiple strikes can be painstaking and error prone. The disclosed automated testing, however, allows testing for MEUs by generating, for example, multiple nodes that a test current can be applied to from a list of the nodes. The definition of "multiple" can be any two or more nodes with the understanding that some architectures may require more than two nodes to have noise injected simultaneously. In some embodiments, test current values less than the large test current may be applied to multiple nodes to test for MEUs. The lesser test current values may only be one or two order magnitudes greater than the critical charge of a node.

Regarding the critical charge, the circuit evaluator 130 may be further configured to apply at least one other test current to nodes identified as sensitive nodes until determining a critical charge of the sensitive nodes. Thus, the circuit evaluator 130 may apply additional test currents for nodes determined as sensitive nodes. Several passes of test currents may be applied to search for the critical charge by progressively backing off the injected test currents representing noise until the node of the memory storage device is undisturbed. The circuit evaluator may then directly calculate the SER using the critical charges on the various noise sensitive nodes and employing the drawn transistor drain area of a sensitive node as an indicator of the probability of a radiation strike.

Monte-Carlo techniques may be used by the circuit evaluator 130 to apply test currents representing noise to all nodes of the memory storage device design. The injected test currents may be at different assigned charge levels so that the resulting disturbed states will reflect the overall noise sensitivity of the memory storage device. The charge levels or values of the test current can be varied algorithmically (such as linearly between some minimum and maximum charge, or exponentially) or randomly. Applying the charges to multiple nodes may more readily reflect the relative noise sensitivity of the memory storage device to EMI/EMC noise coupled in by crosstalk on a low Vdd section of an IC design.

Figure 2:
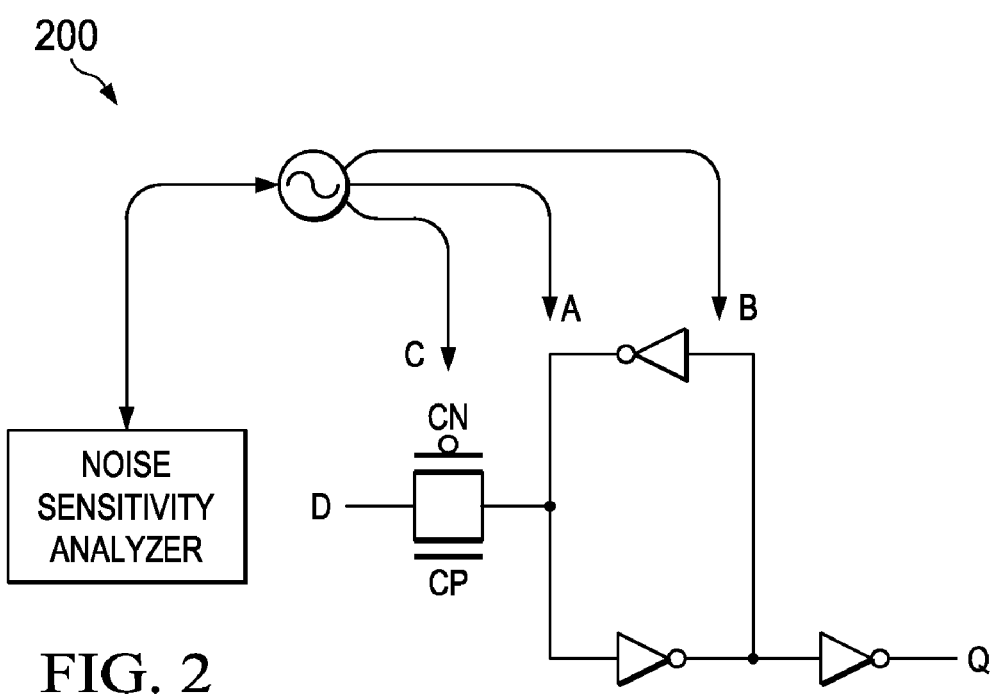
FIG. 2 represents an embodiment of the application of test currents to nodes of a latch according to the principles of the present invention.

FIG. 2 represents an embodiment of the application of test currents to nodes of a latch 200 according to the principles of the present invention and with reference to FIG. 1. The circuit reservoir 110 may receive a model of the latch 200 from a library cell. The latch 200 is a conventional latch including a passgate controlled by a positive clock pulse (CP) signal and a negative clock pulse (CN) signal. The circuit parser 120 may then search and identify three nodes of the latch 200, Nodes A, B and C. As illustrated the noise sensitivity analyzer 100 can then apply or direct the application of the large test current to the identified nodes of the latch 200. Subsequent test currents may also be applied to the nodes under the direction of the noise sensitivity analyzer 100 to determine, for example, the critical charge for one or all of Nodes A, B and C.

Figure 3:
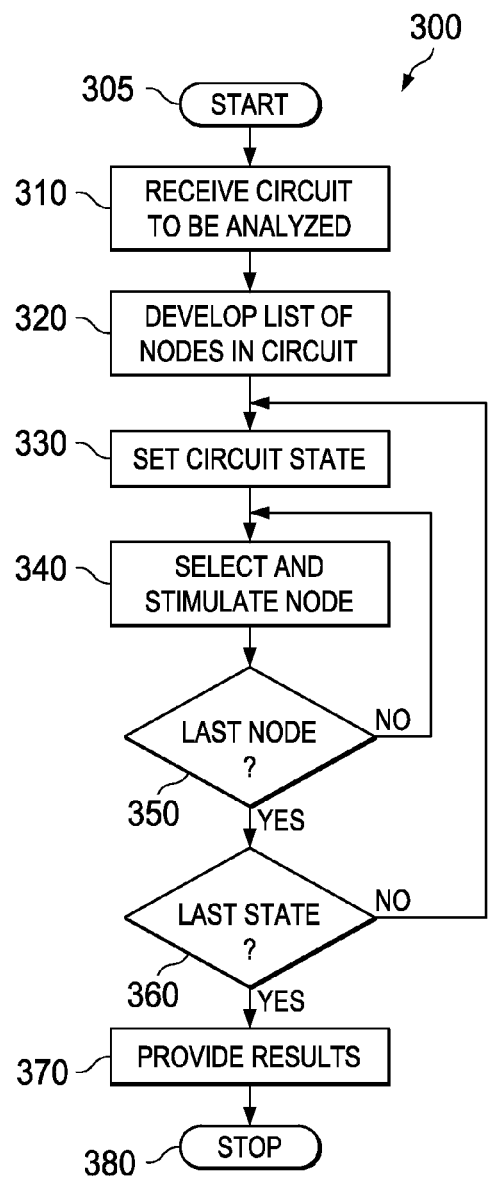
FIG. 3 is a flow diagram of an embodiment of a method of analyzing a circuit for noise sensitivity carried out according to the principles of the present invention.

FIG. 3 is a flow diagram of an embodiment of a method 300 of analyzing a circuit for noise sensitivity carried out according to the principles of the present invention. A noise sensitivity analyzer may be used to carry out the method 300. In some embodiments, the method 300 may be carried in parallel on multiple noise sensitivity analyzer. Alternatively, a single noise sensitivity analyzer may direct the operation of multiple computing devices to carry out the method 300 in parallel. The method 300 begins in a step 305.

In a step 310, a circuit to be analyzed is received. The circuit, (i.e., a circuit model representing the circuit) may be received from a cell library. The circuit includes at least one memory storage device. In some embodiments, the circuit may include multiple memory storage devices.

After receiving the circuit, a list of nodes in the circuit is developed in a step 320. A netlist file may be used to locate each of the nodes. A circuit state for the nodes is selected thereafter in a step 330. The circuit state may be selected from a list of the possible circuit states for the circuit. The first circuit state selected may be referred to as the initial circuit state. Subsequent circuit states will also be selected as discussed below.

After a circuit state is selected, one of the nodes of the circuit is selected and stimulated in a step 340. Any one of the nodes may be selected initially. The selected node 340 is stimulated by applying a large test current that represents noise. A generic noise model may be used that, for example, includes large test currents for different fabrication technologies. Thus, a large test current can be selected based on the fabrication technology of the circuit. As such, the value of the large test current may be redefined with each fabrication technology.

After stimulating the selected node, a determination is made in a first decisional step 350 if the selected node is the last node of the circuit. If the selected node is not the last node, then the method 300 continues to step 340 where another node is selected and stimulated. If the selected node is the last node, the method 300 continues to a second decisional step 360 where a determination is made if the circuit state is the last of the possible circuit states. If the circuit state is not the last of the possible circuit states, then the method 300 continues to the step 330 where a different circuit state is selected. If the circuit state is the last of the possible circuit states for the circuit, then the method 300 continues to a step 370 where the results of the analysis of the circuit performed by the method 300 are provided. The results may be reported graphically as a histogram. After the results are provided, the method 300 ends in a step 380.

Figure 4:
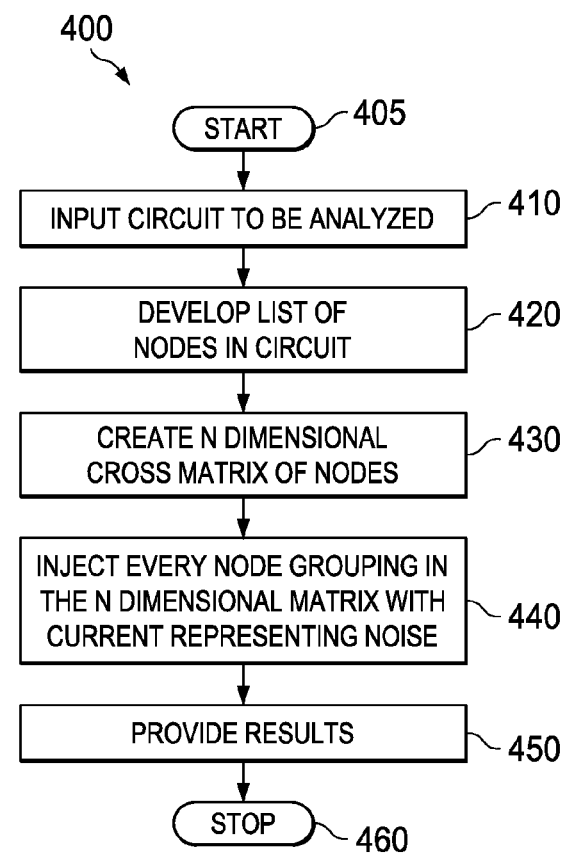
FIG. 4 is a flow diagram of another embodiment of a method of analyzing a circuit for noise sensitivity carried out according to the principles of the present invention.

FIG. 4 is a flow diagram of another embodiment of a method 400 of analyzing a circuit for noise sensitivity is carried out according to the principles of the present invention. In FIG. 4, the method 400 presents an embodiment of determining MEUs for a circuit. Thus, instead of manual calculations, the method 400 can be used to automatically analyze the response of circuits to MEUs. The method 400 begins in a step 405.

In a step 410, a circuit to be analyzed is received. In one embodiment, a circuit reservoir may be used to receive the circuit. The circuit includes at least one memory storage device. After receiving the circuit, a list of nodes in the circuit is developed in a step 420. Conventional means may be used to develop a list of the nodes in the circuit.

After developing a list of the nodes, an N dimensional cross matrix including the nodes is created in a step 430. N may be automatically selected based on the number of nodes that are included in the circuit. In a step 440, every node grouping in the N dimensional matrix is injected with current representing noise. Thus, MEUs can be simulated. The current injected may be a large test current. An initial pass may be done in which only pairs of nodes are grouped together and subsequently simulated with simultaneous current injection using the large test current. Subsequent passes may be done with groups of more nodes such as 3 nodes.

For example, consider 2 states of a simple latch where the enable is off so that data is latched (i.e., D=1 and Q=0 and Q=0 and D=1). Additionally, consider there are 2 nodes on the back-to-back inverters inside the latch which can be designated as nodes Q and QN (i.e., the latch has unbuffered outputs). A test matrix can be created by injecting current on each node as represented below where each "1" represents injecting current on that node.

|         | D | Q | QN |
|---------|---|---|----|
| trial 1 | 0 | 0 | 1  |
| trial 2 | 0 | 1 | 0  |
| trial 3 | 1 | 0 | 0  |
| trial 4 | 0 | 1 | 1  |
| trial 5 | 1 | 0 | 1  |
| trial 6 | 1 | 1 | 0  |
| trial 7 | 1 | 1 | 1  |

The above matrix can be expanded by considering additional nodes such as CP and CN and applying the test current. In some embodiments, some trials, for example trial 7, may be eliminated to reduce analysis time since the probability of this occurrence is lesser than the other trials and may be seen as remote. In other embodiments, unlikely occurrences could be weighted based on probability and still considered for determining MEUs.

After injecting the current, results are provided in a step 450. The results may include which combination of nodes causes a change in the logic state of the memory storage device when the current was applied. The method 400 ends in a step 460.

Figure 5:
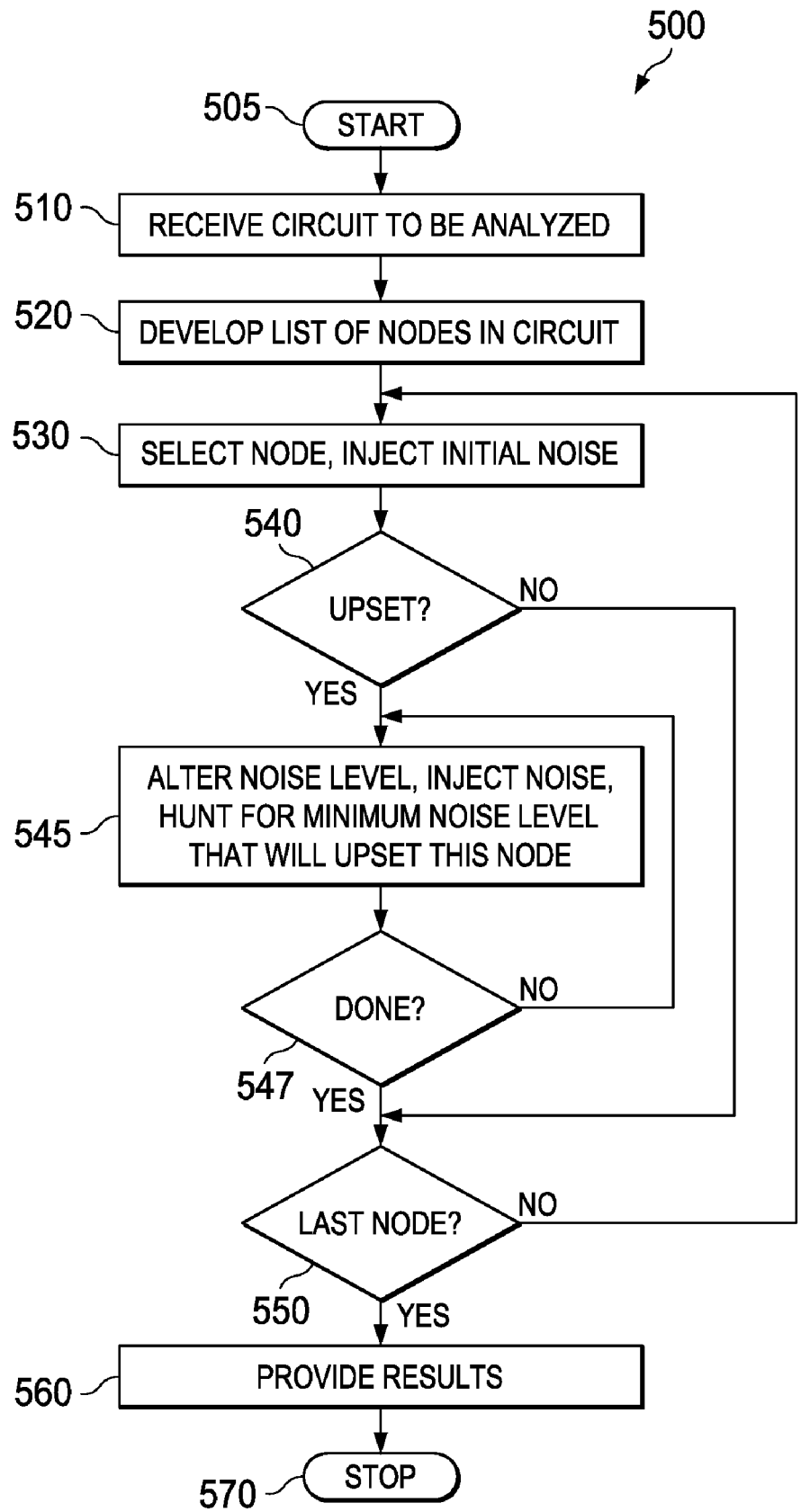
FIG. 5 is a flow diagram of an embodiment of a method of determining a critical charge of a node of a memory storage device according to the principles of the present invention.

FIG. 5 is a flow diagram of an embodiment of a method 500 of determining a critical charge of a node of a memory storage device according to the principles of the present invention. The method 500 begins in a step 505. In a step 510, a circuit to be analyzed is received. A list of the nodes in the circuit is developed in a step 520. In a step 530, one of the nodes is selected and a large test current is applied. A determination is then made in the first decisional step 540 if the logic state of the node is upset (i.e., does the logic state change). If the node is not upset, the method 500 continues to a second decisional step 550 where a determination is made if the node is the last node of the circuit. If the node is the last node, the method continues to a step 560 where the results of the test according to the method 500 are provided. The method 500 then ends in a step 570.

Returning now to decisional step 540, if the node is upset, then the minimum noise level that will upset the node (the critical charge) is determined in a step 545. To determine the critical charge, the value of the current applied (the large test current) is reduced and the new test current is applied until minimum level that cause node upset is determined. In a third decisional step 547, a determination is made if the critical charge for the node has been determined. If so, the method 500 continues to step 550. If not, the method 500 returns to step 545 where applied current is again reduced.

The disclosure detailed an analyzer and methods for determining the noise sensitivity of circuits. As disclosed herein in the embodiments, automated analysis of circuits for noise sensitivity includes: (1) storing data into memory storage devices for testing, (2) stimulating the memory storage device with simulations of injected current on each node of the design (singly or with multiple simultaneous stimulations), (4) employing the results to evaluate the noise sensitivity of the design, possibly including tests for MEUs, determining critical charges, etc., and (4) repeating the above with all possible circuit states of the memory storage device.

The analysis of the circuits is architecturally independent. Thus, a circuit model is presented regardless of architecture and nodes are determined. Thereafter, the large test current can be applied.

The analysis may be performed as single processing or multi-threaded processing employing parallel computing environments. The analysis of the circuits may also be for multiple noise sources. Thus, the sensitivity to different noise sources can be determined (i.e., radiation SER analysis and low power EMC/EMI analysis).

The above-described system, apparatus and methods may be embodied in or performed by various conventional digital data processors or computers, wherein the computers are programmed or store executable programs of sequences of software instructions to perform one or more of the steps of the methods, e.g., steps of the method of FIGS. 3-5. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIGS. 3-5.

Those skilled in the art to which this application relates will appreciate that other and further additions, deletions, substitutions and modifications may be made to the described embodiments.

What is claimed is:

1. A noise sensitivity analyzer, comprising:
   a circuit reservoir configured to receive and store a model of a circuit having at least one memory storage device to be analyzed;
   a circuit parser configured to identify nodes of said model; and
   a circuit evaluator configured to apply a test current to each of said nodes for multiple circuit states of said at least one memory storage device and determine which of said nodes are sensitive nodes, wherein said multiple circuit states include each possible logic state of said at least one memory storage device.

2. The noise sensitivity analyzer as recited in claim 1, wherein said circuit evaluator is configured to apply said test current to only one of said nodes at a time.

3. The noise sensitivity analyzer as recited in claim 1, wherein said circuit evaluator is further configured to apply at least one other test current to said nodes identified as sensitive nodes until determining a critical charge of said nodes identified as sensitive nodes.

4. The noise sensitivity analyzer as recited in claim 1, wherein said circuit evaluator is further configured to apply at least one other test current to all of said nodes.

5. The noise sensitivity analyzer as recited in claim 1, wherein said at least one storage memory device is a cell storage element and said circuit evaluator is configured to apply said test current to each of said nodes for said multiple circuit states wherein said multiple circuit states further include both clock states for said cell storage element.

6. The noise sensitivity analyzer as recited in claim 1, wherein said circuit evaluator is configured to apply said test current to multiple of said nodes simultaneously.

7. The noise sensitivity analyzer as recited in claim 1, wherein said circuit evaluator is configured to apply said test current employing an electrical current simulator.

8. A method of analyzing a circuit for noise sensitivity, comprising:
   receiving, by a processor, a model of a circuit having at least one memory storage device to be analyzed;
   identifying nodes of said model;
   applying a test current to each of said nodes for multiple circuit states of said at least one memory storage device, wherein said multiple circuit states include each possible logic state of said at least one memory storage device; and
   determining which of said nodes are sensitive nodes.

9. The method as recited in claim 8, wherein said applying said test current includes applying said large test current to only one of said nodes at a time.

10. The method as recited in claim 8, further comprising applying at least one other test current to said nodes identified as sensitive nodes until determining a critical charge of said nodes identified as sensitive nodes.

11. The method as recited in claim 8, further comprising applying at least one other test current to all of said nodes.

12. The method as recited in claim 8, wherein said at least one storage memory device is a cell storage element and said applying includes applying a test current to each of said nodes for said multiple circuit states wherein said multiple circuit states further include both clock states of said cell storage element.

13. The method as recited in claim 8 further comprising simultaneously applying said test current to multiple of said nodes.

14. The method as recited in claim 8, wherein said value of said test current is based on the fabrication technology of said circuit.

15. A method of determining a critical charge of a node of a memory storage device, comprising the steps of:
   (a) receiving, by a processor, a model of a circuit having at least one memory storage device to be analyzed;
   (b) identifying nodes of said model;
   (c) applying a test current to one of said nodes for multiple circuit states of said at least one memory storage device, wherein said multiple circuit states include each possible logic state of said at least one memory storage device;
   (d) determining if said one node is a sensitive node for each of said multiple circuit states; and
   (e) applying additional test currents to said one node if said one node is a sensitive node until a critical charge of said one node is determined.

16. The method as recited in claim 15, wherein step (e) includes refining values of said test currents until a logic state of said memory storage device is undisturbed.

17. The method as recited in claim 15, wherein said large test current is based on a fabrication technology of said circuit.

18. The method as recited in claim 15, wherein steps (c) to (e) are repeated for each of said nodes.

* * * * *